Oct. 12, 1965 R. D. ANDERSON 3,211,910
CALIBRATED INFRARED SOURCE, ADJUSTABLE FOR
SPECTRUM, FREQUENCY, AND INTENSITY
Filed Dec. 10, 1962
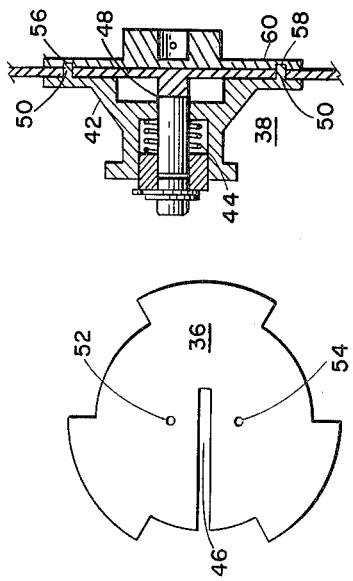
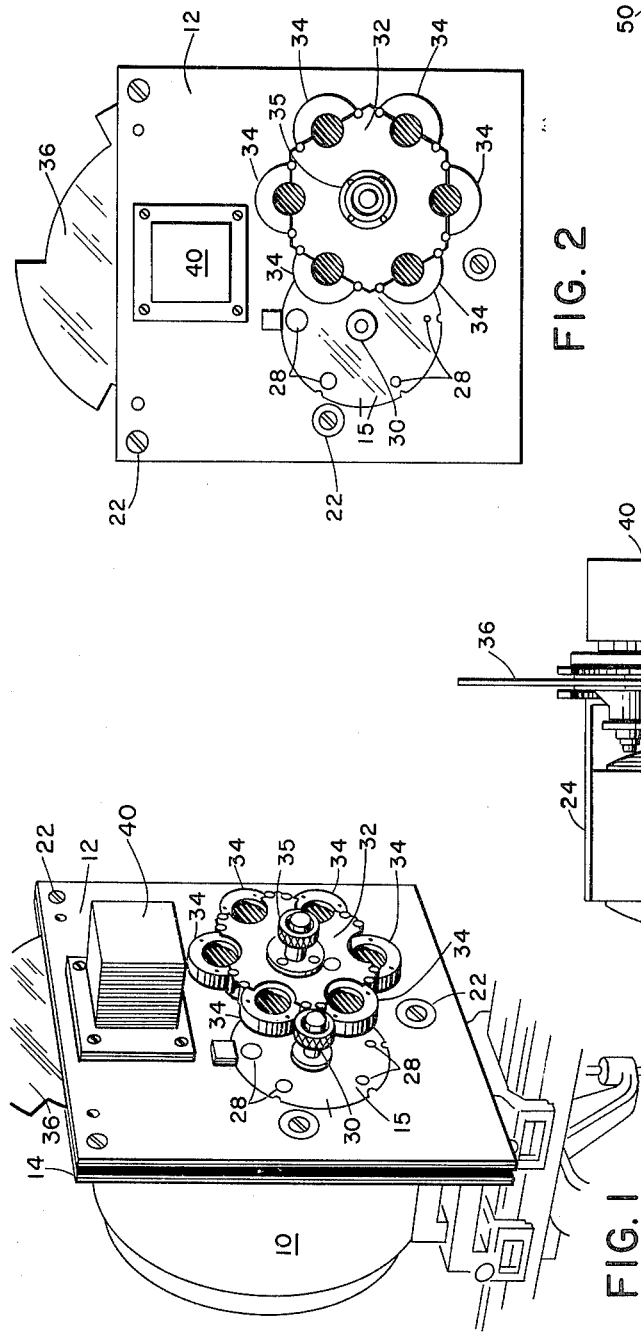
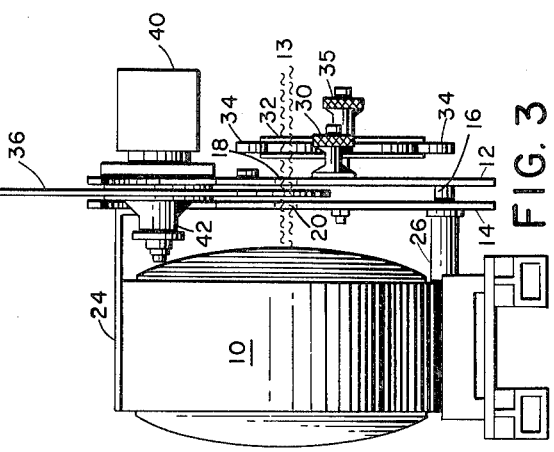
RICHARD D. ANDERSON
INVENTOR.
BY
ATTORNEYS United States Patent Office 3,211,910
Patented Oct. 12, 1965

3,211,910
CALIBRATED INFRARED SOURCE, ADJUSTABLE FOR SPECTRUM, FREQUENCY, AND INTENSITY
Richard D. Anderson, Riverside, Calif., assignor to the United States of America as represented by the Secretary of the Navy
Filed Dec. 10, 1962, Ser. No. 243,691
5 Claims. (Cl. 250—86)
(Granted under Title 35, U.S. Code (1952), sec. 266)

The invention herein described may be manufactured and used by or for the Government of the United States of America for governmental purposes without the payment of any royalties thereon or therefor.

The present invention relates to an infrared radiation source and more particularly to an infrared radiation source that is simple in construction and, provides a wide range of spectral radiant emittances and wave length distribution.

In the laboratory, it is desirable for purposes of testing and experiments requiring infrared energy to have a stable source of infrared radiation which can be step adjustable to provide any desired spectral content at any of several calibrated radiance levels (radiant power per unit solid angle per unit area from the source). It is desirable that the radiation be emitted in a D.-C. fashion, or interrupted (chopped) to provide a square wave output which is step adjustable in frequency. Previously, the above was accomplished with laboratory setups using several separate components.

Each of the several components in laboratory setups require precise alignment. This alignment is difficult to maintain where many of the parts are supported by clamps, ring stands, and holders. Also, to accomplish the range mentioned above, it is often necessary to remove one component from the test lash up and replace it with another, with the attendant problems of realignment, etc. Because of the nature of these arrangements, it is virtually impossible to reproduce a previous setup exactly; hence, frequent recalibrations are required. One of the components often found in these setups is a dispersing element, usually a monchromator. Monochromators are expensive devices usually requiring a great deal of special handling, maintenance, and frequent recalibration.

The present invention is composed of six major subassemblies. Raw infrared energy is obtained from a standard black body. Affixed to the black body and thermally insulated from it is a structural assembly including two baffle plates. This structural assembly carries an aperture plate which contains a series of accurately cut and measured apertures; and a fixture which mounts a series of removable filters. The aperture plate and filter fixture rotate around their centers permitting any desired aperture size and filter to be placed before the black body cavity. At each position, the aperture and filter are aligned by a spring loaded detent. A synchronous chopper motor is also carried on the structure and positioned to turn a chopper blade between the baffle plates with the notches in the chopper blades alternately opening and obscuring the black body cavity. The shaft of the chopper motor is fitted with a spring loaded locking device which permits the rapid interchange of chopper blades. The entire source assembly is carried on clamps and mounted and aligned to an optical bench. A series of interchangeable chopper blades are provided to produce a multiplicity of output chopping frequecies. The filter fixture is adapted to hold a set of narrow bandpass spike interference filters which cover the entire spectral region of interest. Additional filters of specialized characteristics may be used as needed. Accordingly, an object of the present invention is to provide one versatile unit which contains all the elements and adjustments normally required of any infrared source system, without using a series of independent components in a laboratory bench type setup.

Another object of the invention is to provide an infrared radiation source having rapidly adjustable chopping frequencies, apertures and wavelengths without requiring modification of the basic elements or alignment of the parts.

A further object of the invention is to provide an infrared radiation source which after the initial calculation, the output of the source will remain constant, and will require recalibration only after extended periods of time.

Other objects and many of the attendant advantages of this invention will become readily appreciated as the same becomes better understood by reference to the following detailed description when considered in connection with the accompanying drawings wherein:

FIG. 1 shows an assembled view of a preferred embodiment of the invention;

FIG. 2 is a front elevation of FIG. 1;

FIG. 3 is a side elevation of FIG. 1;

FIG. 4 is a detailed showing of the chopper blade locking device used in the embodiment shown in FIG. 1; and FIG. 5 shows one configuration of a chopper blade used in the embodiment of FIG. 1.

Referring now to the drawings, wherein like reference characters designate like or corresponding parts throughout the several views, there is shown in FIG. 1 a black body 10 for supplying a source of infrared radiation. Baffle plates 12 and 14 separated by spacers 16 (FIG. 3) and having apertures 18 and 20 respectively are mounted by means of screws 22 and brackets 24, 26 to a black body 10 so that apertures 18 and 20 will be in alignment with radiation 13 source from source 10.

Mounted on plate 12 is a disc 15 having a plurality of graduated apertures 28, which can be rotated manually by means of knurled knob 30 to align one of apertures 28 with apertures 18 and 20. Also mounted on plate 12 is a filter holder 32 for holding a set of graduated filters 34. Holder 32 is manually rotated by means of knurled knob 36 to position one of filters 34 in alignment with apertures 18 and 20. A chopper blade 36 (FIG. 5) is held in position between plates 12 and 14 and rotated at the desired speed by means of hub assembly 38 (FIG. 4) driven by a synchronous motor 40. Latch member 42 is held in position by spring 44. Blade 36 has a slotted portion 46 which permits engagement with lock member 48. Pins 50 integral on the face of latch member 42 project through holes 52, 54 of blade 36 into recess portions 56, 58 of plate 60 which is attached to baffle plate 12. To insert blade 36, latch member 42 is pulled back and when holes 52 and 54 are aligned with pins 50 it is released, thus locking disc 36 to the hub assembly.

In operation, knowing the areas of the apertures, the characteristics of the filters and the black body temperature, the radiant emittance for each filter can be calculated. This is done by multiplying the spectral radiant emittance functions of the black body, as given by the Planck radiation formula, by the transmission function of the filters. The area under the resulting curve describes the energy emitted from black body 10.

Obviously many modifications and variations of the present invention are possible in the light of the above teachings. It is therefore to be understood that within the scope of the appended claims the invention may be practiced otherwise than as specifically described.

What is claimed is:

1. In an apparatus for providing a stable source of infrared radiation which can be step adjusted to provide any desired intensity and spectral content, the combination comprising:
   (a) first and second baffle plates each having an aperture for passing a beam of infrared energy emitted from an infrared source,
   (b) a plate having a plurality of different sized apertures mounted on one of said baffle plates so that one of said different sized apertures may be selectively positioned in alignment with the apertures of said first and second baffle plates to permit a predetermined quantity of energy to pass therethrough,
   (c) a filter holder for receiving a plurality of infrared transmission filters mounted on the same baffle plate as said plate having a plurality of apertures so that one of said filters may be selectively positioned in alignment with the apertures of said first and second baffle plates to permit a predetermined distribution of wave lengths of energy to pass therethrough, and
   (d) driving means positioned on said baffle plates to receive a removable chopper blade between said first and second baffle plates for interrupting said beam of infrared energy at a predetermined frequency.

2. The apparatus of claim 1 wherein said removable chopper blade is a disc shaped member having a plurality of equally spaced slots around its periphery and is interchangeable with a plurality of blades each having a different number of slots.

3. The apparatus of claim 1 wherein said driving means includes a spring loaded quick release clamp and indexing locking means for quickly interchanging chopper blades.

4. In an apparatus for providing one versatile unit which contains all the elements and adjustments normally required of any infrared source system without using a series of independent components in a laboratory bench type setup, the combination comprising:
   (a) first and second baffle plates each having an aperture for passing a beam of infrared energy emitted from an infrared source,
   (b) a plate having a plurality of different sized apertures mounted on one of said baffle plates so that one of said different sized apertures may be selectively positioned in alignment with the apertures of said first and second baffle plates to permit a predetermined quantity of energy to pass therethrough,
   (c) a filter holder for receiving a plurality of infrared transmission filters mounted on the same baffle plate as said plate having a plurality of apertures so that one of said filters may be selectively positioned in alignment with the apertures of said first and second baffle plates to permit a predetermined distribution of wave lengths of energy to pass therethrough, and
   (d) a removable chopper blade drivenly mounted between said first and second baffle plates for interrupting said beam of infrared energy at a predetermined frequency.

5. In an apparatus for providing an infrared radiation source having rapidly adjustable chopping frequencies, apertures and wavelengths without requiring modification of the basic elements or alignment of the parts, the combination comprising:
   (a) first and second baffle plates each having an aperture for passing a beam of infrared energy emitted from an infrared source,
   (b) a plate having a plurality of different sized apertures mounted on one of said baffle plates so that one of said different sized apertures may be selectively positioned in alignment with the apertures of said first and second baffle plates to permit a predetermined quantity of energy to pass therethrough,
   (c) a filter holder for receiving a plurality of infrared transmission filters mounted on the same baffle plate as said plate having a plurality of apertures so that one of said filters may be selectively positioned in alignment with the apertures of said first and second baffle plates to permit a predetermined distribution of wave lengths of energy to pass therethrough, and
   (d) a removable chopper blade drivenly mounted between said first and second baffle plates for interrupting said beam of infrared energy at a predetermined frequency.

References Cited by the Examiner

UNITED STATES PATENTS

| | | | |
|---|---|---|---|
| 2,094,103 | 9/37 | Harsley | 250—86 |
| 2,365,342 | 12/44 | Hilliard | 250—86 |
| 3,084,253 | 4/63 | McHenry | 250—86 |

RALPH G. NILSON, *Primary Examiner.*

JAMES W. LAWRENCE, *Examiner.*